United States Patent [19]

Edge et al.

[11] 3,879,712

[45] Apr. 22, 1975

[54] DATA PROCESSING SYSTEM FAULT DIAGNOSTIC ARRANGEMENTS

[75] Inventors: Gordon Edge, Poole; George Worthington, Bournemouth, both of England

[73] Assignee: Plessey Handel und Investments A.G., Zug, Switzerland

[22] Filed: May 31, 1973

[21] Appl. No.: 365,666

[30] Foreign Application Priority Data

June 3, 1972 United Kingdom .............. 26033/72

[52] U.S. Cl. ............................................ 340/172.5

[51] Int. Cl. .............................................. G06f 11/00

[58] Field of Search ........... 340/172.5; 235/153 AK

[56] References Cited

UNITED STATES PATENTS

| | | | |
|---|---|---|---|
| 3,497,685 | 2/1970 | Stafford et al. | 340/172.5 |
| 3,540,003 | 11/1970 | Murphy | 340/172.5 |
| 3,671,940 | 6/1972 | Kronies et al. | 340/172.5 |
| 3,688,263 | 8/1972 | Balogh, Jr. et al. | 340/172.5 |
| 3,787,818 | 1/1974 | Arnold et al. | 340/172.5 |

*Primary Examiner*—Gareth D. Shaw
*Assistant Examiner*—Michael C. Sachs
*Attorney, Agent, or Firm*—Scrivener, Parker, Scrivener & Clarke

[57] ABSTRACT

The invention provides arrangements for diagnosing faulty equipment using background job diagnostic software running in the on-line PP250 system. Each processor is provided with a diagnostic interface which is connectable to a processor-store bus, either directly or by way of a multiplexor, and which is addressable as part of the PP250 memory complex. Each diagnostic interface provides facilities for (i) forcing data patterns into the microbits and the data area (highway HO), (ii) monitoring important points in the processor equipment such as highway HO, the data-out register, the microbits and (iii) various basic functions relative to the stopping of the micro-program. The diagnostic interface printed circuit boards are normally removed and inserted only when a processor is to be diagnostically exercised.

5 Claims, 4 Drawing Figures

DATA PROCESSING SYSTEM FAULT DIAGNOSTIC ARRANGEMENTS

Figure 1:
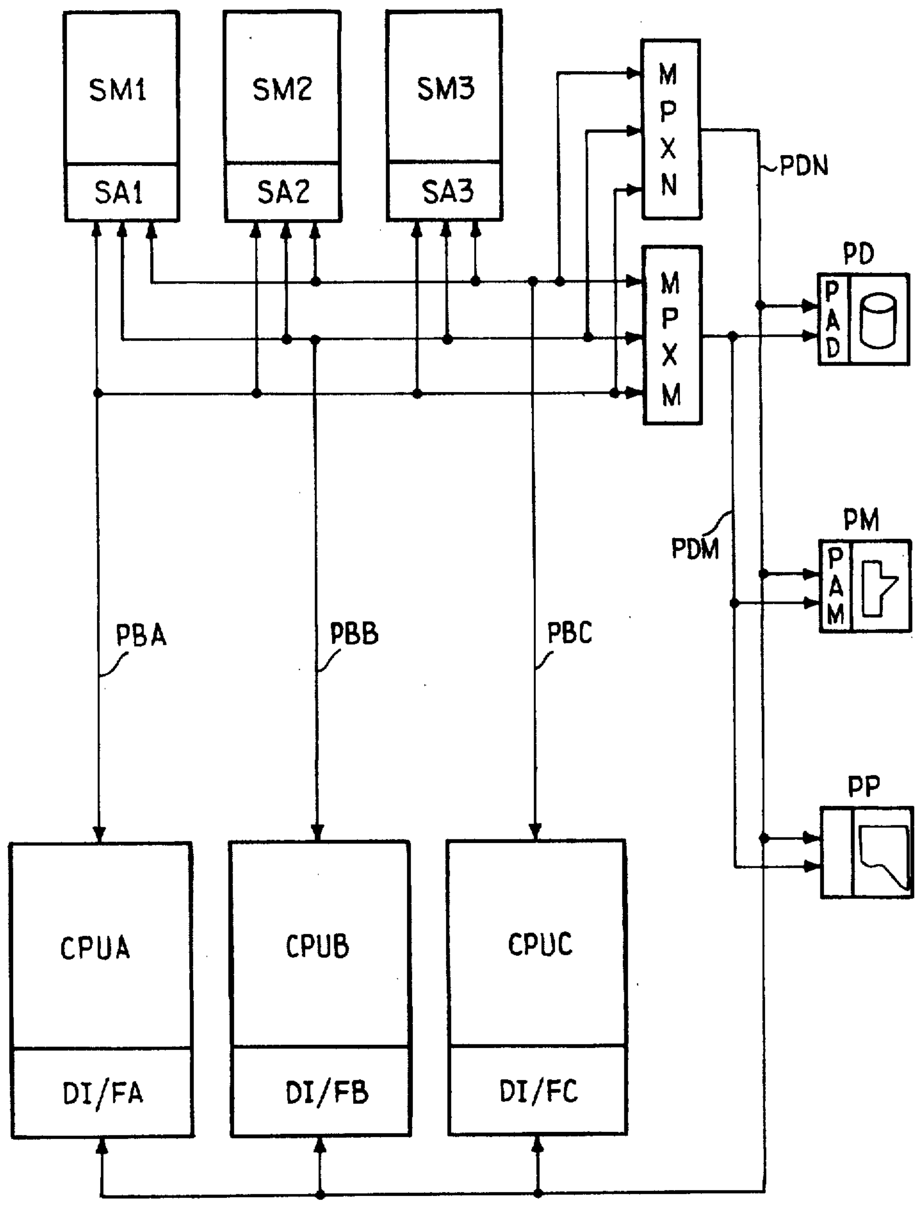

The present invention relates to data processing systems and is more particularly concerned with the provision of fault diagnostic arrangements in such systems.

With the advent of multi-processor systems for the real-time control of communications systems and the like it has become necessary to provide, within such multi-processor systems, fault detection and isolation facilities. Typical of such system facilities are those disclosed in the fault interrupt system of co-pending application Ser. No. 232,463 which culminate in a faulty processor being barred from access to any of the on-line applications programs. The faulty processor is confined to a repetative performance of a checkout program thereby suspending the faulty equipment from the on-line system. When a faulty processor is contained within check-out an inter-processor check, running in another processor, will notice that the processor trapped in checkout is overdue and an appropriate report to a "fault handler" process will be made. The fault handler will then take the necessary actions to reschedule the work currently allocated to the faulty processor and produce, on a maintenance monitor, a message indicating the identity of the faulty processor.

The testing and fault diagnosis routines required to fully check-out and isolate a particular fault in a processor module of a multi-processor system requires highgrade fully skilled and trained maintenance personnel. such personnel may not readily be available in sufficient numbers and it has been suggested previously that automatic diagnostic mechanisms should be provided in such circumstances.

Accordingly it is a prime object of the present invention to provide automatic diagnostic facilities in a multi-processor system which employs the processing abilities of the multi-processor system itself rather than by the provision of special purpose diagnostic equipment.

According to the invention there is provided a digital data processing system including a plurality of processor modules and a plurality of storage-modules and each storage module incorporates an access unit which includes an identity address recognition mechanism and each processor module is provided with a unique data communication path, providing processor module access to all the storage modules, and processor module access to a storage location is performed by extending an address word on the processor module's unique data communication path defining (i) the identity address of the access unit of the storage module in which the required location resides and (ii) the address of the required location within that storage module, characterised in that each processor module incorporates a diagnostic access unit which is connectable to one or more of said unique data communication paths and said access unit includes (i) an identity address recognition arrangement (ii) an address decoder and (iii) a plurality of address-decoder selectable monitor, control and data injecting points internal to the processing equipment of the processor module.

By the provision of a diagnostic interface a faulty processor may be tested by another processor module performing a diagnostic program as a background job. The facilities provided by the diagnostic interface allow the diagnostic program to fully exercise the faulty processor and to monitor the results of such exercises to diagnose the fault. The actual facilities built into the diagnostic interface will depend upon the design of the processor module, however, they can be considered as falling within three main groups. The first group provides facilities to inject any required value, (i) onto some main internal data highway, (ii) onto the microprogram control store output and (iii) onto the microprogram control store address selector. The second group provides facilities for monitoring vital points within the processor module whereas the third group provides miscellaneous control functions to allow specific processor module functional steps to be performed under diagnostic control.

The invention will be more readily understood from the following description which should be read in conjunction with the drawings accompanying the provisional specification. Of the drawings:-

Figure 2A:
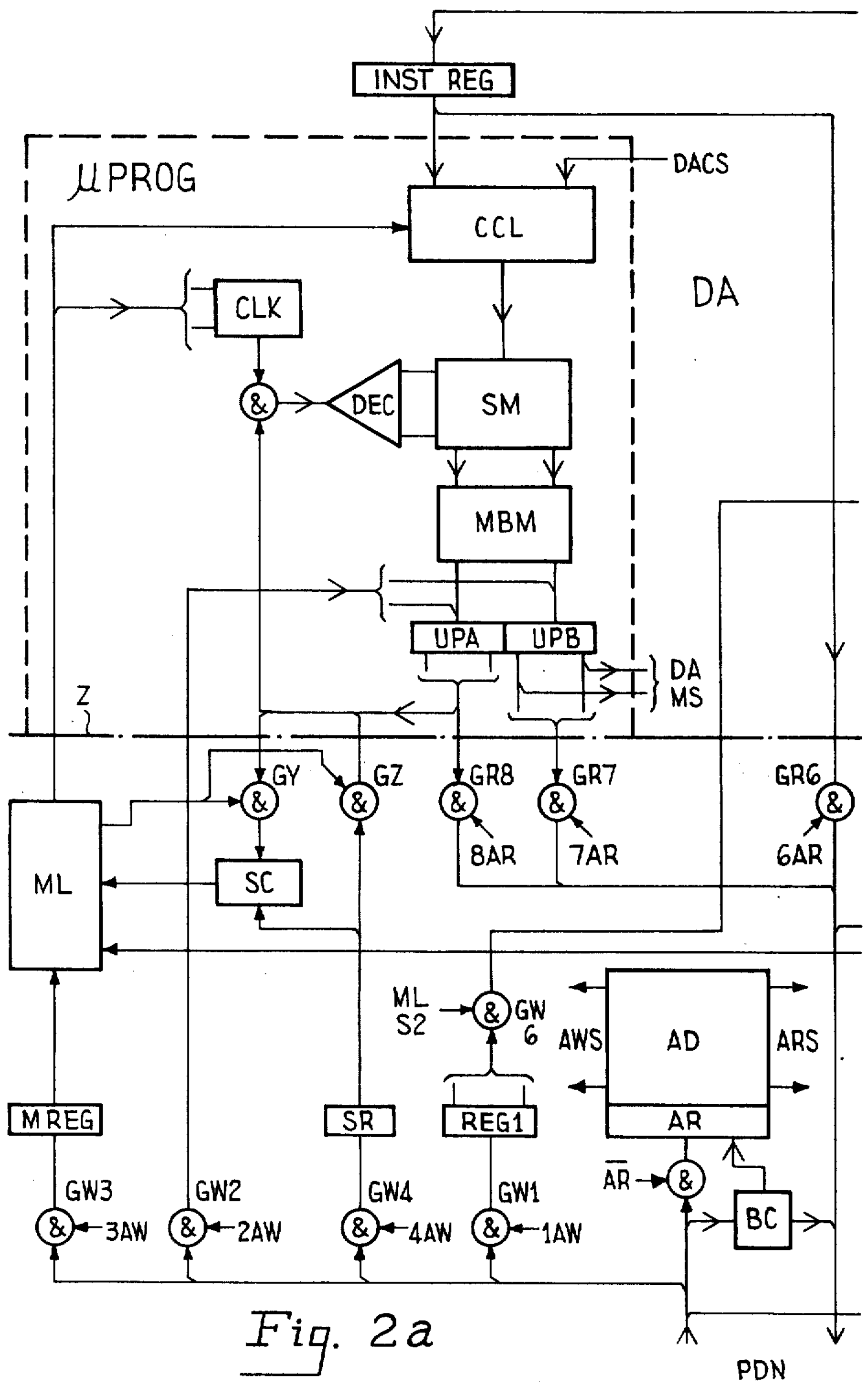
Figure 2B:
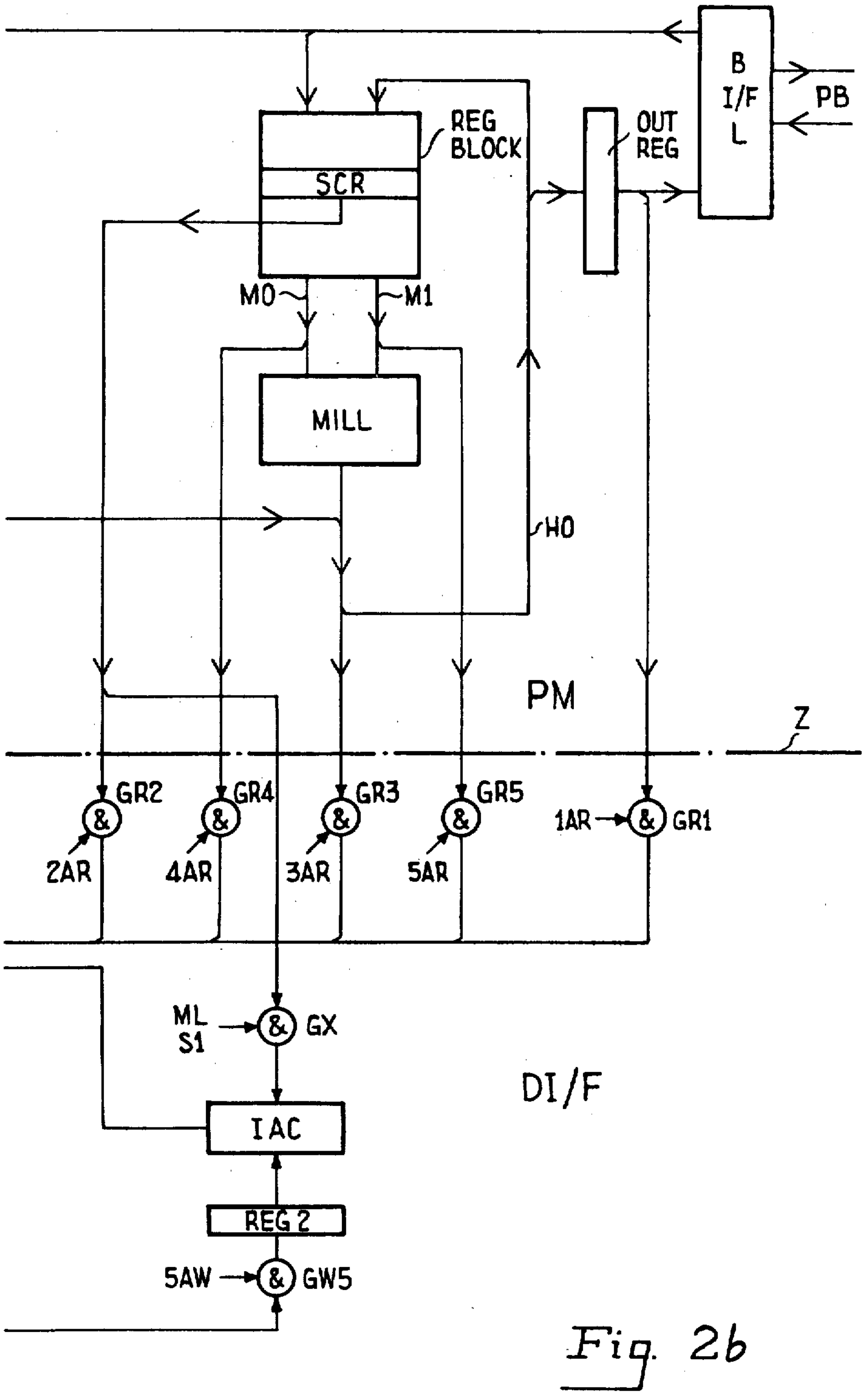
Figure 3:
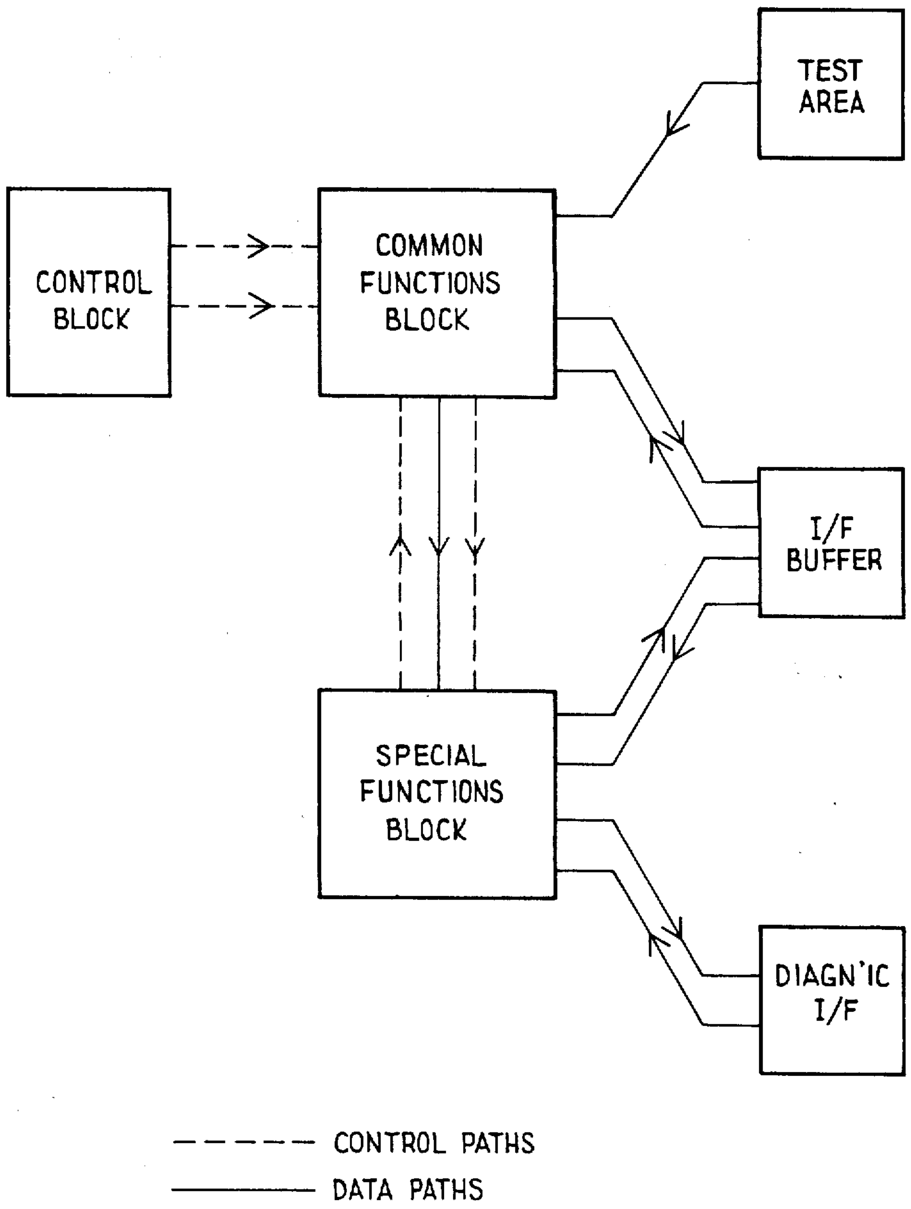

FIG. 1 shows a block diagram of a typical multi-processor system incorporating the invention, FIGS. 2*a* and 2*b* show a block diagram of a typical processor module incorporating a diagnostic interface according to the invention and should be placed side-by-side with FIG. 2*b* on the right, while FIG. 3 shows a block diagram of the diagnostic monitor software.

The multi-processor system to which the invention is more particularly, although not exclusively, suited is shown in FIG. 1 and this type of system is disclosed in our copending application Ser. No. 265,410 now U.S. Pat. No. 3,787,818. The system consists of a plurality of processor modules (CPUA, CPUB and CPUC), a plurality of storage modules (SM1, SM2 and SM3), a pair of multiplexors (MPXM and MPXN) and a plurality of peripheral equipments such as PD, PM and PP. Each processor module is provided with a unique data communication path or bus (PBA, PBB and PBC respectively) over which access to all storage modules and all peripheral equipments is obtained. Each processor bus includes a parallel information signal highway and a control signal highway in both directions. Each storage module is provided with an access unit (SA1, SA2 and SA3 respectively) upon which each processor module bus is individually terminated. Each access unit includes a module address identity recognition mechanism which is arranged to detect a "storage module access demand" indicated by the application of the storage module's identity address to a specified part of the information signal highway of a processor bus. The access units are also arranged to resolve concurrent conflicting access demands in a predetermined priority order.

A pair of multiplexors, MPXN and MPXM are provided in the system of FIG. 1 so that the peripheral equipments are "buffered" from store module or processor module additions. Each multiplexor is functionally the same as a store access unit, multiplexing peripheral demands onto the peripheral data communication paths or busses PDM and PDN. The peripheral busses, PDM and PDN are each individually connected to separate ports on the peripheral access units such as PAD, PAM and PAP. The peripheral busses are similarly configured (i.e. having information and control signal highways) to the processor module busses.

Each peripheral access unit includes an equipment identity address recognition mechanism and a number of processor-module-addressable administration registers (such as data-in, data-out, status and control registers). The peripheral equipments shown are typical only and signify a disc PD, a diagnostic monitor typewriter equipment PM and a page printer PP.

The system is organised such that the processor modules simply perform "read" and "write" bus operations when information is to be communicated from or to a storage location or a peripheral equipment. In the case of the storage location the read or write operation is specified by the code set onto the control signal highway section of the processor bus and is accompanied by an address on the information signal highway of the processor bus. The address defines (i) the storage module in which the required location resides and (ii) the address of the required location within the particular storage module. Similarly when information is to be read from or written into a peripheral equipment the read or write operation code is accompanied by an address on the information highway of the bus defining (i) a multiplexor, (ii) the peripheral equipment required and (iii) the addressable administration register within the peripheral equipment. This allows the processor module (i) to write to the peripheral equipment's control register to exercise control over the functioning of the peripheral equipment including its access unit, (ii) to write to the data-out register information for passage-on and manipulation by the peripheral equipment, (iii) to read from the status register to define the current functional state of the peripheral equipment including the access unit and (iv) to read from the data-in register information for passage into the control processing system.

One of the peripheral busses, bus PDN in the case shown in FIG. 1, is extended to the access path of a diagnostic interface (DI/FA, DI/FB and DI/FC respectively) of each processor module. EAch diagnostic interface is functionally identical to that of the peripheral access units in that it includes an identity address recognition mechanism and a plurality of addressable monitor points and registers analagous to the administration registers.

Under normal on-line system working circumstances the diagnostic interface equipment, shown in block diagram form in FIGS. 2*a* and 2*b* as DI/F, is "removed" so that faulty processor module access, by way of the diagnostic interface, to a good processor module is prevented. When a faulty processor module has been reported to the maintenance personnel by way of the monitor typewriter PM the diagnostic interface printed circuit boards are inserted in the diagnostic interface for the faulty processor alone.

Considering now FIGS. 2*a* and 2*b* a typical processor module PM is shown in the upper sections of these figures above the dividing line Z—Z. The processor module comprises two main areas namely the micro-program area μPROG, shown in FIG. 2*a* within the broken line box and the data area DA. Both areas involve parallel path working, however, for ease of presentation single paths only are shown in the drawings.

The data area consists of (i) a block of registers REGBLOCK, (ii) an instruction register INSTREG, (iii) an arithmetic and logic unit MILL, (iv) a processor module bus interface logic unit BI/FL and (v) a bus interface register, referred to as the out register OUTREG. Typically the processor module corresponds to that shown in U.S. Pat. No. 3,787,813 in which the register block REGBLOCK contains an accumulator register stack and capability base and limit register stacks. Included in the accumulator register stack is the sequence control register SCR which at all times defines the absolute store address of the current instruction word.

The data area, which stores and manipulates the information being processed by the processor module, is controlled by data area manipulation control signals DAMS. These control signals are produced by a set of toggles known as micro-bits (UPB). The micro-program area sets and resets these micro-bits as required together with a set of toggles known as the micro-program address toggles (UPA).

The micro-program area μPROG consists of (i) a register having some 150 bits, for the UPA and UPB micro-bits, (ii) a decoder DEC, (iii) a slot matrix SM, (iv) a micro-bit matrix MBM, (v) a block of combinational logic CCL for data area conditional signals DACS and (vI) a micro-program slot control clock CLK. The instructions of the processor, as defined by the instruction word in the INSTREG, are implemented by a series of micro-programs, each micro-program consisting of several sequentially performed micro-instructions or slots. The processor is advanced from one slot to the next by the clock CLK. The next slot being selected by the UPA address operating on the slot matrix. The current data area conditions signals DACS also condition the slot matric which produces for each slot a set of micro-bits which condition the processor module in the execution of the micro-instruction, and hence micro-programs, for each machine instruction.

The diagnostic interface unit DI/F, shown below the line Z—Z in FIGS. 2*a* and 2*b*, includes a peripheral bus access unit which is formed by an address register AR, and address decoder AD and a bus control signal circuit BC. The diagnostic interface unit also includes arrangements (gates GR1 to GR8 inclusive) for extracting information from the data area (gates GR1 to GR6 inclusive) and the micro-program area (gates GR7 and GR8) for passage over the peripheral bus PDN. The diagnostic interface unit further includes arrangements (gates GW1 and GW2) allowing information patterns to be injected into the data area (gates GW1) and the micro-program area (gates GW2) together with arrangements (the equipment associated with gates GW3 to GW5 inclusive) providing miscellaneous control functions. Each of the above mentioned gates, represents a block of AND gates which control the passage of information over parallel information paths and each block of AND gates is controlled by an address signal produced by the address decoder AD.

Each access over a processor bus, it will be recalled, comprises the application of a location address to the information signal highway, accompanied by a code on the control signal highway indicating the type of access required. Each address specifies the identity of the module or equipment required together with the location within the module or equipment (i.e. storage location, peripheral equipment administration register or diagnostic interface facility). Consequently included in the address decoder AD is a comparator which is arranged to compare the processor module's system identity address with a predetermined part of the address information applied to the peripheral bus PDN. When coincidence is experienced the rest of the address information in the address register AR is gated into the address decoder to produce a selection signal to activate the required function. The selection signals fall into two groups shown as AWS (the write selection signal) and ARS (the read selection signals). The AWS signals control the data pattern injecting facilities (gates GW1 and GW2) and the miscellaneous control functions (the equipment associated with gates GW3 to GW5) while the ARS signals control the information monitoring point facilities (gates GR1 to GR8 inclusive). The control code on the control signal highway of the peripheral bus defines the read or write requirement of each access and consequently the address decocer AD also inspects this control signal highway when generating the required address signal.

The monitoring facilities provided are as follows:

a. The contents of the OUTREG (gates GR1 opened by address signal 1AR)

b. the current instruction address (gate GR2 opened by address signal 2AR)

c. the information on highway HO (gate GR3 opened by signal 3AR)

d. the information on highway MO (gate GR4 opened by signal 4AR)

e. the information on highway M1 (gate GR5 opened by signal 5AR)

f. the contents of the INSTREG (gate GR6 opened by signal 6AR)

g. the contents of the micro-bit register UPB (gate GR7 opened by signal 7AR)

h. the contents of the micro-address register UPA (gate GR8 opened by signal 8AR).

The forcing facilities provided are as follows:

a. the writing of information onto highway HO (gate GW1 opened by 1AW)

b. the conditioning of the micro-bit registers UPA and UPB (gate GW2 opened by 2AW).

The miscellaneous control functions are provided by conditioning the miscellaneous register MREG and the registers REG1, REG2 and the slot register SR. The setting to the "1" state of various bits of the miscellaneous register provides the following functions by acting upon the miscellaneous logic ML:

Bit O - Enables the processor clock CLK. The number of clock pulses produced is determined by the states of bits 1 to 5 and 16 to 18 of register MREG.

Bit 1 - Single slot, i.e. one clock pulse.

Bit 2 - Single instruction. When the clock is enabled the processor clock runs to complete the current instruction.

Bit 3 - Stop at SCR value specified by bits 8 to 23 of the data written into REG2. Comparator IAC compares the SCR value (via gates GX) with the register REG2 value.

Bit 4 - As bit 3 but including bits 4 to 7 of SCR.

Bit 5 - As bit 4 but including bits 0 to 3 of SCR.

Bit 6 - Forces the data sent to REG1 on to HO if bit 1 is also set (i.e. activates gate GW6 by producing signal MLS2)

Bit 7 - Inhibit micro-program decode. This bit inhibits the micro-program decoding for the next slot from the current UPA.

Bits 8 to 12 - Not used.

Bit 13 - Repeat. This bit inhibits the clocking of SCR so that the current instruction may be repeated.

Bits 14 and 15 - Not used.

Bit 16 - Stop after "n" slots. When the processor clock is enabled this bit causes the processor to perform the number of slots specified by the data written to the slot register SR.

Bit 17 - Stop at fault. This bit causes the processor to stop when UPA equals zero, that is when it is about to enter the fault interrupt micro-program.

Bit 18 - Stop at a particular slot. When the processor clock is enabled the processor runs until UPA equals the value previously written to the slot register SR. Comparator SC compares the current slot address (via gated GY) with the register SR value.

Bits 19 to 23 - Not used.

Typically, the miscellaneous logic ML includes a clock pulse generator which is started by the setting to the one state of any of bits 1, 2, 3, 4, 5, 16, 17 or 18 of register MREG and is stopped by outputs from any one of a number of generator control gates. Typically the generator control gates are activated after 1 pulse (bits MR1), when the select next instruction micro-bit occurs (bit MR2), when the instruction address comparator IAC detects equality between the SCR value and the value in REG2 (bits MR3, 4 or 5) or when the slot comparator SC detects equality between the UPA value and the value in the slot register SR (bits MR 16, 17 or 18). Also included in the miscellaneous logic ML are gating arrangements to produce the signals MLS1 (bits MR3, MR4 or MR5), MLS2 (bits MR1 and MR6) and micro-bit control signals for the control of the micro-program decoding (bit MR7) and for the micro-bit signal which clocks the SRC (bit MR13) for repeat instruction operation.

Once the diagnostic interface boards are in place one of the remaining serviceable processor modules may be scheduled, in a background mode, to perform a diagnostic monitor program. This program consists of a string of diagnostic interface transactions which apply a series of tests to the logic of the processor with diagnostic inspection of the results of the tests with the assistance of a fault dictionary.

The view taken of the machine while implementing the diagnostic monitor program is that of a model which consists of one large data register and a block of combinational logic. The outputs of the data register provide the inputs to the large block of combinational logic the outputs of which are fed back to inputs of the data register. The diagnostic interface and processor module registers provide the data register function whereas the processor module manipulative and micro-program areas provide the combinational logic function.

The diagnostic tests simply consist of setting the data register into the required state to provide the required input conditions to the combinational logic. The outputs from the combinational logic which results will be examined by clocking the relevant part of the data register and reading its contents.

As mentioned previously the diagnostic monitor runs as a low priority job on a known good processor module. Transfers to and from the diagnostic interface are carried out just as though that interface unit was another module of store. The diagnostic monitor, as shown in FIG. 3, consists essentially of three code blocks, the CONTROL BLOCK, the COMMON FUNCTIONS BLOCK and the SPECIAL FUNCTIONS BLOCK and three data blocks the TEST AREA, the INTERFACE BUFFER and the DIAGNOSTIC INTERFACE.

The TEST AREA contains one sub-test of the diagnostics during interpretation by the diagnostic monitor. The INTERFACE BUFFER acts as a buffer between the diagnostic tests and the DIAGNOSTIC INTERFACE which of course is part of the faulty processor module itself.

The CONTROL BLOCK provides the interface between the diagnostic monitor and its environment, i.e. the operating system and the maintenance engineer. It provides input/output facilities for the monitor to the engineer running the diagnostics.

The COMMON FUNCTIONS BLOCK provides the basic features of the diagnostic monitor. The common functions provide facilities for setting up and manipulating the information in the INTERFACE BUFFER.

The SPECIAL FUNCTIONS BLOCK provides those features of the diagnostic monitor which are specific to the type of equipment under test and in any system the number of versions of the SPECIAL BLOCK depends upon the numbers of types of equipment to be tested.

The interface between the Diagnostic Software and a faulty processor is provided by means of the diagnostic interface which provides access to various points within the faulty processor, some of which can only be read while others of which also can be forced to a required value. Access to and from the various points is gained from the diagnosing processor by addressing a range of store locations whose module number (i.e. bits 12 to 23 is 11110000XXXX, where XXXX is variable for each particular processor in the system.

The various addresses used and the points they give access to are listed below. The addresses are given in octal and represent the bottom 12 bits of the address and they are decoded by the address decoder AD of the diagnostic interface to produce GW or GR signals.

Address 0401

This address activates gates GW3 to provide access to the miscellaneous register MREG within the diagnostic interface itself. The miscellaneous register provides the various miscellaneous control functions listed above to condition the miscellaneous logic ML in its control of the processor clock CLK.

Address 0404

When reading from this address gates GR1 are activated and the contents of the OUT register are read onto the bus PDN.

Address 0410

The value of the SCR at which the CPU is required to stop is written into REG2 by the activation of gates GW5 and this address is used on conjunction with bits 3, 4 and 5 of the miscellaneous register.

When the CPU has been stopped by some other mechanism the value of the sequence control register SCR can be found by reading from this address and in this case the address decoder AD activates gates GR2.

Address 0420

Writing to this address the address decoder AD activates gates GW4 to condition the slot register SR to specify either the number of slots the faulty processor module is required to perform or the slot it is required to stop at in conjunction with the setting of bits 16, 17 and 18 of the miscellaneous register MREG. When the processor module is required to perform "n" slots (bit

16) the "n" value is set in bits 0 to 6 of the data to be written to this address. When the CPU is required to stop at a particular slot (bit 18) the slot address is set in bits 0 to 6 of the data to be written to this address; in both cases the slot address in SC is compared with the current value of UPA, over gates GY, and when coincidence occurs the processor module clock is stopped by the miscellaneous logic ML. A zero value is set into SR when bit 7 is marked as a zero condition in UPA is indicative of a fault interrupt condition. When a read is performed on this address the data gives, by way of gates GR8, the value of the address of the current slot (i.e. the state of UPA).

Address 0500

For both write and read operations this address gives access to and from highway HO, by way of gates GW and GR3 respectively. Having written the required value of HO to this address (i.e into register REG1) to get that value actually on to HO gates GW6 must be activated by writing to address 0401, the miscellaneous register MREG, with bit 6 set to activate signal MLS2.

Address 1004

This address can only be read from and it gives the contents of the processor highway MO by activating gate GR4.

Address 1020

This address can only be read from and gives the contents of the processor highway M1 by activating gate GR5.

Address 2001

This address provides access to the mocrobits and can be written-to by activating gate GW2 and read-from by activating gates GR7 and GR8. This allows the microbits to be forced to a required pattern or their current pattern to be monitored. For ease of presentation it has been assumed that a single 24 bit word is produced by the microbit matrix. In practice many more micro-bits are produced for each slot and typically a number of addresses will be used to allow access to up to say 10 blocks of 20 bits each of the micro-bit pattern.

Address 4040

This address can only be read from and gives the value of the current setting of the instruction register INSTREG by activating gates GR6.

It was mentioned above that associated with the diagnostic software is a so-called Interface Buffer.

The contents of the Interface Buffer are as shown below:

| WORD (OCTAL) | USE |
|---|---|
| 00 | Spare |
| 01 | HO |
| 02 | MO |
| 03 | M1 |
| 04 | SCR |
| 05 | OUT |
| 06 | MISC. REG (Copy Read from Interface) |
| 07 | FUN |
| 10 | REG |
| 11 | SPARE |
| 12 | SPARE |
| 13 | SPARE |
| 14 | SPARE |

-Continued

| WORD (OCTAL) | USE |
|---|---|
| 15 | LAST SLOT - UPAL |
| 16 | CURRENT SLOT - UPAC |
| 17 | NEXT SLOT - UPAN, UPA |
| 20 to 31 | Ten words for ubits UPB |
| 32 | Misc. Reg. Buffer (referred to as MRB) |
| 33 | CLOCK Buffer (referred to as CB) |
| 34 to 37 | SPARE |

The Diagnostic Tests can only cause words 01 and 17 to 33 to be set up but can use the information in words 00 to 31. When transferring information to the diagnostic interface words 01 and 17 to 32 can be transferred, however, when transferring information from the diagnostic Test interface to the Interface Buffer words 00 to 31 can be set-up. The transfers to and from the diagnostic interface are controlled by the CLOCK and IF statements of a Diagnostic Language.

The Miscellaneous Register Buffer contains information which is to be written to the miscellaneous register MREG in the diagnostic interface. The significance of the bits within the word and their effects on the miscellaneous logic ML have already been described.

The Clock Buffer is used by the CLOCK and IF statements to control the transfers to and from the diagnostic interface slot register SR as well as being used in conjunction with the Miscellaneous Register Buffer to control the forcing of information on to HO and enabling the CPU Clock. The use of the Clock Buffer and Miscellaneous Register Buffer is described more fully in the description of the language.

The Diagnostic Language

The Diagnostic Tests may be specified by a series of statements making up a Diagnostic Language. Typical suitable statements are described below.

The MODE Statement

Before commencing any tests the faulty processor and diagnostic interface must be set into the required mode. The possible modes are:

a. OWN MODE - This mode is used when debugging the data area DA of the processor. Under these circumstances the Diagnostic Programmer/Engineer is effectively providing his own micro-programs. While in this mode the microporgram decoding is inhibited. The statement will cause bits 1 and 7 of MRB to be set as well as bits 0 and 6 of CB, the remaining bits being reset.

b. SS MODE - Single Slot Mode. This mode is used when it is required to single slot the processor through a particular micro-program etc. The statement will cause bit 1 of MRB to be set as well as bits 0 and 6 of CB, the remaining bits being reset.

c. SI MODE - Single Instruction Mode. This mode is used when it is required that the processor performs a single instruction at full speed. The statement will cause bit 2 of MRB to be set as well as bit 0 of CB, the remaining bits being reset.

d. RUN MODE - This mode allows the processor to perform a program and is usually used in conjunction with the STOP AT SCR statement. The statement causes bit 0 of CB to be set, the remaining bits of CB, as well as MRB being reset.

e. MONITOR MODE - This mode is identical to the Own Mode except that upon entry to this mode the contents of words 17 to 33 of the Interface Buffer are dumped for later use by the Revert Statement. Words 17 to 33 are then cleared and bits 1 and 7 or MRB and bits 0 and 6 of CB set. This mode will usually be used when in SS or SI mode and it is required to either examine or change the contents of a register which is not directly accessible via the Test Interface.

f. REVERT - This statement is used to terminate the Monitor Mode and revert back to the original mode the test was being performed in. It causes words 17 to 33 to be reloaded with the contents dumped by the Monitor Mode. Additionally bit 23 of CB is set.

Forcing Highway HO

The main highway of the machine can be forced to any required value by the statement:

HO = VALUE

VALUE can take any of the following forms:

i. A signed decimal integer ii. An octal integer iii. A label, e.g. FRED whereupon the contents of the location referred to by FRED are forced on to HO.

iv. A label enclosed in suitable brackets, e.g. (FRED) whereupon the absolute address of the location referred to by FRED is forced on to HO.

Forcing Microbits

To force any required microbits all that is required is to state the relevant microbits to be set or reset.

The effect of this is to cause the relevant bit in the ten words of the Interface Buffer (addresses 20 to 31) to be set or reset as required. Additionally bit 23 of the CLOCK BUFFER will also be set.

Forcing the Micro-program Address

The micro-program can be forced to any required value by the statement:

UPA = VALUE

The effect of this statement is to place the VALUE in word 17 of the Interface Buffer and set bit 23 of CB.

The CLOCK Statement

Having set up the conditions for a test the test is actually performed in the faulty processor by the statement CLOCK, which basically enables the CPU CLOCK. However, the CLOCK statement is one of the statements which control the transfer of information between the Interface Buffer and the Test Interface itself. The complete list of actions to be carried out by the CLOCK statement are as follows:

i. If bit 6 of the CLOCK Buffer is found to be set HO is transferred to the diagnostic interface.

ii. If bit 23 of the CLOCK Buffer is set then words 17 to 31 of the Interface Buffer are transferred to the diagnostic interface. These words of the Interface Buffer are then set to zero.

iii. Bit 23 of the CLOCK Buffer is then reset.

iv. MRB is then ORed with the Clock Buffer and the result written to the Miscellaneous Register MREG in the diagnostic interface. This action enables the CPU clock.

v. The miscellaneous register MREG contents are then repeatedly read from the diagnostic interface until bit 21 is found to be set. This indicates that the processor has stopped.

vi. When the processor has stopped the SCAN routines are entered to set up the interface buffer by reading from the relevant addresses of the diagnostic interface.

The IF Statement

The IF statement is used to check the result of a Test. The general form of the IF statement is as follows.

IF (Expression) THEN (Statement) ELSE (Statement)

ELSE is optional (Statement) can be either, one of the other statements described above or a series of these statements.

(Expression) can take the forms described below.

To check any of the words 01 to 17 of the Interface Buffer (Expression) takes the form (Register or Highway name) = VALUE To check individual bits or groups of bits of words 01 to 17 of the Interface Buffer (Expression) takes the form (Register or Highway name). (Bit Position) = VALUE or (Register or Highway name). (Bit Position = VALUE (Bit Position)

(Bit Position) takes the form of a NAME which is assigned a value.

To check individual microbits (Expression) takes the form (Microbit Name) ON or (Microbit Name ) OFF To check that all the microbits are in a certain state (Expression) takes the form UPB = (List of Microbits which are set)

It is possible to check the last value of the microprogram address, the current value and the next value, i.e. the one that has been decoded from the current value but not yet clocked into UPA. For these (Expression) takes the form

UPAL = VALUE

UPAC = VALUE

UPAN = VALUE respectively

The UPR Statement

The microbits and the micro-program address can be reset by the statement UPR. This causes a copy of MRB to be obtained, bit 22 set and the result written to the miscellaneous register MREG in the diagnostic interface. Words 17 to 31 of the Interface Buffer are then set to zero.

The PRINT Statement

This statement will cause a message to be printed on a teletype

PRINT (Message)

The STOP Statement

While writing the Diagnostic Tests it may be necessary to allow the faulty processor to run at normal speed through a series of slots, or in fact through a series of instructions. These facilities will be implemented by the STOP statement which may be qualified by a. STOP AT UPA = nnn This statement can only be used in the SI and RUN MODES. When the clock of the processor is subsequently enabled it caused the processor to run until slot "nnn" is encountered. This is detected using the slot register SR set to *nnn* and the slot comparator SC monitoring, over gates GY, the current slot address in UPA as the faulty processor runs.

This statement causes *nnn* to be written to address 0420 of the Test Interface and bit 18 of MRB to be set.

b. STOP AFTER × SLOTS

This statement can only be used in the SI and RUN MODES. When the clock of the processor is subsequently enabled it causes the processor to run for x slots.

This statement causes a pattern with bit x−1 set to be written to address 0420 of the diagnostic interface and bit 16 of MRB to be set. This allows the miscellaneous logic ML to control the number of slots performed in accordance with the SR value.

c. STOP AT SCR = VALUE

This statement can only be used in the RUN MODE. When the clock of the processor is subsequently enabled it causes the processor to run until the SCR value equals the required value.

The statement causes VALUE to be written to address 0410 of the Test Interface (i.e. into register REG2) and bits 3, 4 and 5 of MRB to be set. This causes gates GX to be activated and the instruction address comparator IAC will continuously compare the current SCR value with the value in REG2. Coincidence causes the miscellaneous logic ML to inhibit the processor clock CLK.

The above description has been of one embodiment of the invention only and is not intended to be limited thereto. Alternative features will readily be seen by those skilled in the art. For example only one connection to each diagnostic interface is shown in FIG. 1 and it will readily be appreciated that each diagnostic interface could be served by either or both peripheral busses. In the case of both, priority demand resolution circuitry would be accommodated in each diagnostic interface. Similarly it has been stated that in the on-line non-faulty state of the system the diagnostic interface equipment is removed, however, it is possible for this equipment to remain in situ and for the peripheral bus to be broken between the last peripheral and the first diagnostic interface. Similarly the diagnostic interfaces may be driven directly from a specific processor bus or busses rather than by way of a multiplexor. Additionally a typical diagnostic language has been disclosed however it should be realised that differing processor modules will require differing diagnostic interfaces and consequently differing language statements.

What we claim is:

1. A digital data processing system comprising in combination:

a plurality of processor modules;

a plurality of data communication paths, one for each processor module allocated on a mutually exclusive basis and arranged to carry processor module generated address information;

a plurality of multi-port access units each including a data communication path selection and termination means and an identity address recognition means conditioned with a unique identity code and responsive to said unique identity code within said address information when applied to any one of said data communication paths;

a plurality of addressable memory modules each having a unique identity and incorporating one of said access unit;

a group of addressable peripheral equipments each having a unique identity and incorporating one of said access units and a plurality of diagnostic interface units one for each processor module and each having a unique identity and incorporating one of said access units and including an address decoder and a plurality of address-decoder selectable monitor, control and data injection points internal to the processing equipment of the said processor module and said address decoder is responsive to part of said address information accompanying the unique identity code particular to a diagnostic interface, a processor module having a fault being diagnosed by another processor module of said digital data processing system.

2. A digital-data processing system according to claim 1 wherein each said diagnostic interface unit includes a plurality of address-decoder selectable registers into which processor module generated control and data injecting information is written by applying to a data communication path said information accompanied by diagnostic interface and register identity address information.

3. A digital data processing system according to claim 2 wherein each said diagnostic interface unit includes a plurality of address-decoder selectable monitor points from which monitor information is read by an interrogating processor module by applying to a data communication path diagnostic interface and register identity address information.

4. A digital data processing system according to claim 3 wherein said processor equipment includes a clock control device and said diagnostic interface unit includes a clock control logic device and one of said control registers controls the functioning of said clock control logic.

5. A digital data processing system comprising in combination:

a plurality of processor modules;

a plurality of data communication paths one for each processor module allocated on a mutually exclusive basis and arranged to carry processor module generated address information;

a plurality of first multi-port access units each including a data communication path selection and terminating means and an identity address recognition means conditioned with a unique identity code and responsive to said unique identity code within said address information when applied to any one of said data communication paths;

a plurality of addressable memory modules each having a unique identity and incorporating an individual one of said first access units.

a plurality of addressable multiplexor equipments each having a unique identity and incorporating one of said first access units and said multiplexor equipment is arranged to give access to a data transfer path;

A plurality of second multi-port access units each including a data transfer path selection and terminating means and an identity address recognition means conditioned with a unique identity code and responsive to said unique identity code within said address information when applied to any one of said data transfer paths;

a group of peripheral equipments each having a unique identity and incorporating one of said second access units;

a plurality of diagnostic interface units one for each processor module and each having a unique identity and incorporating one of said second access units and including an address decoder and a plurality of address-decoder selectable monitor, control and data injection points internal to the processing equipment of the said processor module and said address decoder is responsive to part of said address information accompanying the unique identity code particular to a diagnostic interface, a processor module having a fault being diagnosed by another processor module of said digital data processing system.

* * * * *